(12) United States Patent
Gailloux et al.

(10) Patent No.: US 9,203,978 B1
(45) Date of Patent: Dec. 1, 2015

(54) PROVIDING AN ITEM OF CONTENT TO A MOBILE DEVICE IN A PREPAID CONTEXT

(71) Applicant: Sprint Communications Company L.P., Overland Park, KS (US)

(72) Inventors: Michael A. Gailloux, Overland Park, KS (US); John Michael Everson, Leawood, KS (US); Jeffrey Scott Dillon, San Marcos, CA (US); Robin D. Katzer, Olathe, KS (US); Jason Robert-Anthony Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/066,227

(22) Filed: Oct. 29, 2013

Related U.S. Application Data (63) Continuation of application No. 12/710,503, filed on Feb. 23, 2010, now Pat. No. 8,611,850.

(51) Int. Cl.
  *G06F 15/16* (2006.01)
  *H04M 17/00* (2006.01)
(52) U.S. Cl.
  CPC .................... *H04M 17/10* (2013.01)
(58) Field of Classification Search
  CPC ......... H04W 4/12; H04W 4/24; H04W 12/08; H04M 17/10
  USPC ................ 455/406, 408; 379/144.01; 709/23; 705/26, 40
  See application file for complete search history.

(56) References Cited

U.S. PATENT DOCUMENTS

| | | |
|---|---|---|
| 2002/0077929 A1 | 6/2002 | Knorr et al. |
| 2003/0086548 A1 | 5/2003 | Nelson |
| 2004/0107136 A1 | 6/2004 | Nemirofsky et al. |
| 2005/0234860 A1 | 10/2005 | Roever et al. |
| 2006/0153073 A1 | 7/2006 | Ghiware et al. |
| 2007/0266130 A1 | 11/2007 | Mazur et al. |
| 2009/0168660 A1 | 7/2009 | Bhatia et al. |
| 2009/0171839 A1 | 7/2009 | Rosano et al. |
| 2009/0186598 A1 | 7/2009 | Cipoletti et al. |

OTHER PUBLICATIONS

Notice of Allowance, dated Aug. 12, 2013 U.S. Appl. No. 12/710,503, 14 pages.
Non-Final Office Action, dated Mar. 15, 2013 U.S. Appl. No. 12/710,503, 20 pages.
Applicant Initiated Interview Summary, dated Nov. 21, 2011 U.S. Appl. No. 12/710,503, 3 pages.

(Continued)

*Primary Examiner* — Sam Bhattacharya (57) ABSTRACT

Methods and products for providing an item of content to a mobile device in a prepaid context by way of a wireless telecommunications network are provided. One embodiment of a method includes receiving an indication that the item of content is desired to be communicated to a mobile device (which is associated with a certain customer); determining that the customer obtains wireless-telecommunications services by way of either a piecemeal plan or a recurring-fees plan; when the customer is associated with the piecemeal plan, determining that a remaining amount of the prepaid balance is insufficient to pay for the desired content (and thereby triggering a first follow-up process); and when the customer is associated with the recurring plan, determining that an immediate-payment option does not exist (and thereby triggering a second follow-up process).

20 Claims, 7 Drawing Sheets

(56) References Cited

OTHER PUBLICATIONS

Pre-Interview First Office Action, dated Oct. 3, 2011 U.S. Appl. No. 12/710,503, 4 pages.

Hutheesing, Nikhil, "Cellmania's Wireless Apps", Published Jun. 13, 2006, 5 pages. Last accessed Jul. 16, 2015. Available at: http://www.forbes.com/2006/06/12/cellmania-qualcomm-amdocs-wireless-in_nh_0612unwired_inl.html.

PROVIDING AN ITEM OF CONTENT TO A MOBILE DEVICE IN A PREPAID CONTEXT

CROSS REFERENCE TO RELATED APPLICATIONS

This application is a continuation of, and claims priority from, U.S. patent application Ser. No. 12/710,503, filed Feb. 23, 2010, entitled "PROVIDING AN ITEM OF CONTENT TO A MOBILE DEVICE IN A PREPAID CONTEXT," which is incorporated herein by reference in its entirety.

SUMMARY

Embodiments of our technology are defined by the claims below, not this summary. A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to facilitate providing an item or set of items of content to a mobile device in a prepaid context when there is no way to contemporaneously pay for the items when payment is required.

BRIEF DESCRIPTION OF THE SEVERAL VIEWS OF THE DRAWINGS

Illustrative embodiments of the our technology are described in detail below with reference to the attached drawing figures, wherein.

DETAILED DESCRIPTION

The subject matter of the present technology is described with specificity herein to meet statutory requirements. However, the description itself is not intended to define the technology, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| ASCII | American Standard Code for Information Interchange |
| AFB | American Foundation for the Blind |
| CDMA | Code Division Multiple Access |
| GPRS | General Packet Radio Service |
| GSM | Global System for Mobile communications: originally from Groupe Special Mobile |
| IP | Internet Protocol |
| Piecemeal plan | A prepaid scenario in which a customer provides in advance a payment amount that is billed against as telecommunications services are used such that when the sum reaches zero (or some minimum threshold), a defined set of services (possibly all) are no longer available until the customer provides additional funds. This is sometimes referred to in the art as pay-as-you go (or "paygo" for shot) model. |
| Prepaid | A scenario in which a customer makes a payment in advance for wireless telecommunications services. A credit card can be kept on file in some cases. |
| Recurring-fees plan | A prepaid scenario in which a customer provides in advance a payment amount in order to receive a set of telecommunications services until a certain date occurs. Examples include monthly unlimited plans or some cyclical not-to-exceed plans. |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
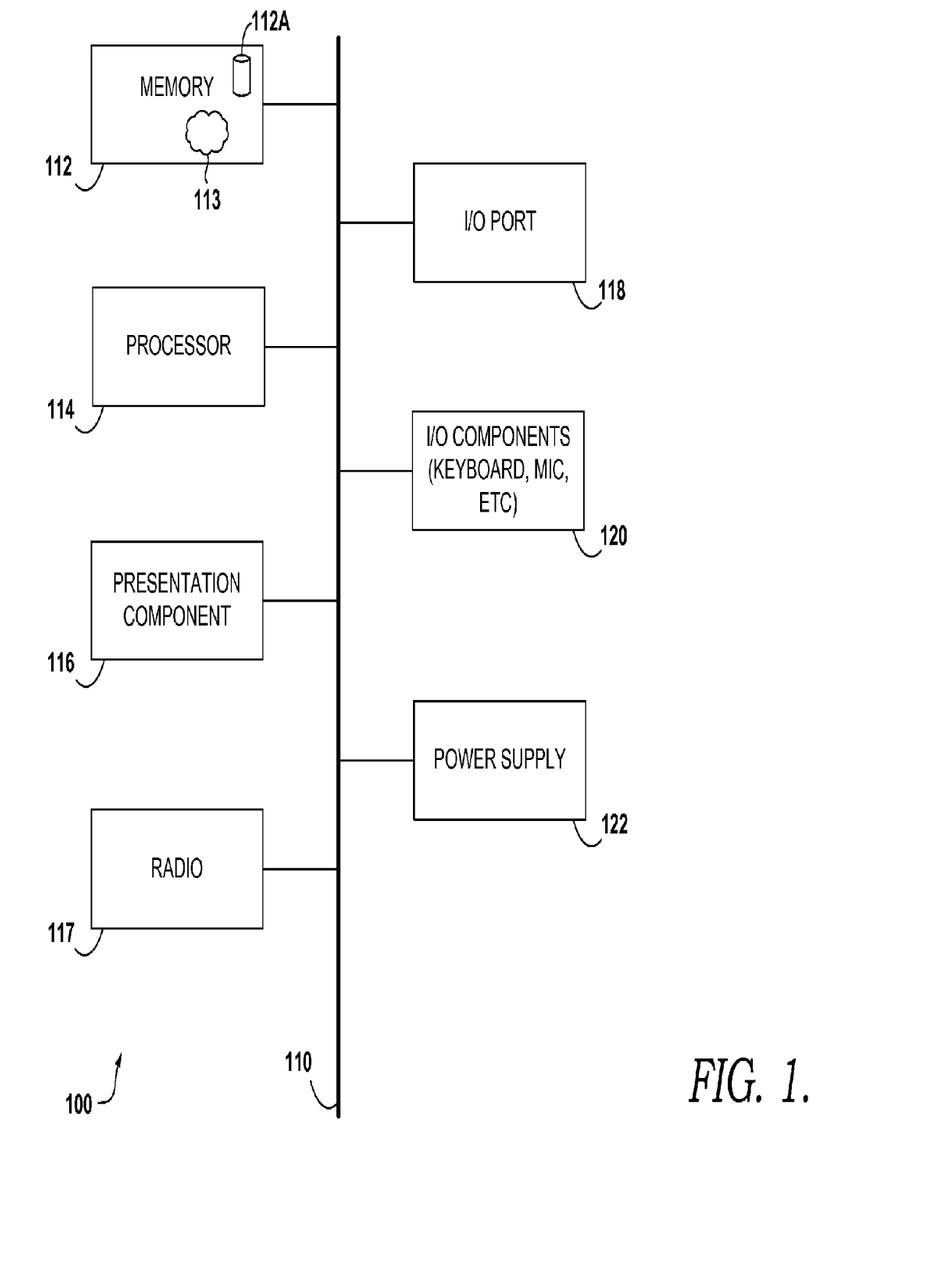
FIG. 1 depicts an illustrative device suitable for use in connection with an embodiment of our technology.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We have previously described various memory components that memory 112 might take the form of. Thus, we will not elaborate more here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 100.

Figure 2A:
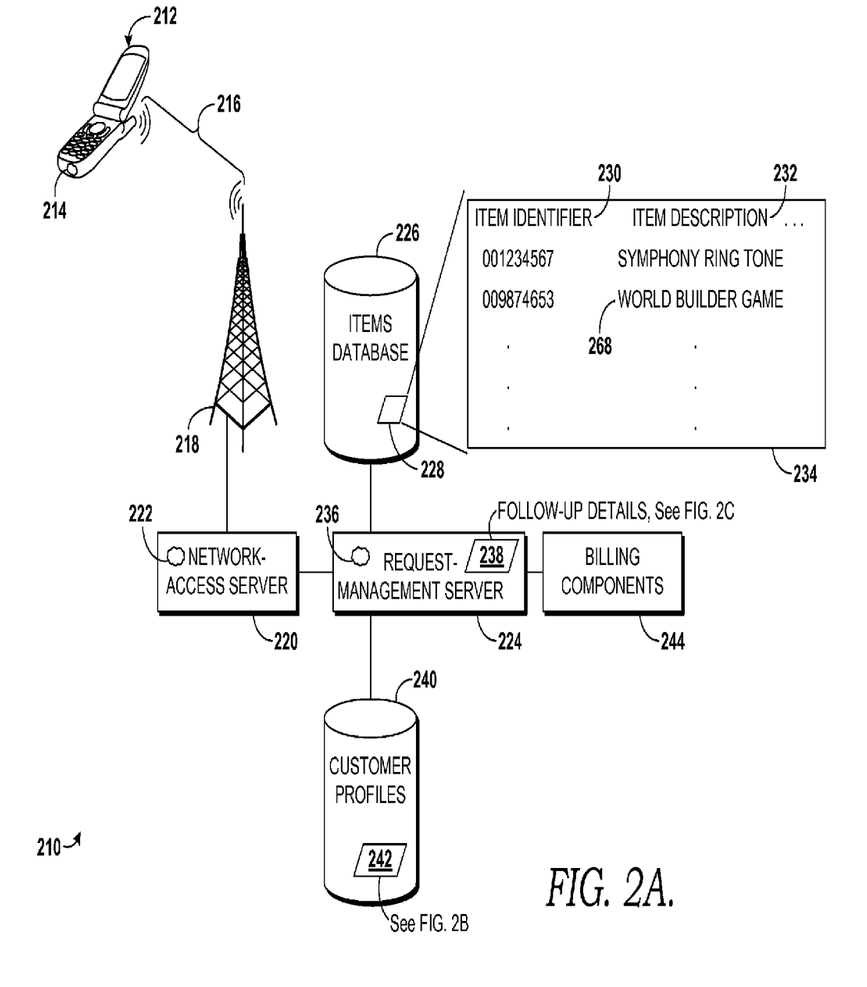
FIG. 2A depicts an illustrative operating environment suitable for practicing an embodiment of our technology.

Turning now to FIG. 2A, an illustrative operating environment suitable for practicing an embodiment of our technology is provided and referenced generally by the numeral 210. Operating environment 210 includes a mobile communications device 212 (which might variously be referred to herein as a mobile device, mobile computing device, or just device depending on readability). Mobile device 212 includes an application 214 that takes the form of a set of computer-executable instructions embodied on one or more types of computer-readable media that we previously mentioned.

Mobile device 212 communicates via wireless communications 216 with a base transceiver 218. BTS 218 is representative of various wireless-telecommunications devices that facilitate communications with mobile device 212. Other components that interact with BTS 218 are not shown so as to not obscure other aspects of our technology. For example, items such as a radio-network controller and other devices are not shown. In one embodiment, BTS 218 is coupled to a network-access server 220, which provides access to other portions of a wireless telecommunications network. In one embodiment, network-access server 220 includes a set of embodied computer-executable instructions ("application") 222. Although we might use the term "application" throughout this document, when we do we are referring to a set of computer-executable instructions that are embodied on one or more types of computer-readable media as previously mentioned. Network-access server 220 receives requests to access a wireless telecommunications network, and in some embodiments facilitates actions such as receiving an IP address to be allocated to mobile-communications device 212, authorizing communications with other components in the wireless telecommunications network, and other functions. In some embodiments, network-access server 220 performs functions identical to or similar to a foreign agent or similar device.

In the embodiment shown, network-access server 220 is coupled to a request-management server 224, which receives requests from mobile device 212 to obtain one or more items of interest. The items of interest can be stored in an items database 226, which might take the form of multiple databases even though only one is shown. This is true with many components of FIG. 2A. That is, although only a single block item is shown, we do not mean to imply a sense of singular versus plural. Although only one request-management server is shown, in reality it might be the case that embodiments of our technology employ tens or hundreds of such servers. If we attempted to show all the various arrangements, that would obscure other aspects of our technology. A range of different types of items can be stored in items database 226. For example, items database 226 might store ring tones, songs, videos, clip art, music art, screensavers, books, services, and the like. In some situations, links to such items are stored instead of the items themselves. For example, an illustrative Table 228 shows that one way of storing items is by way of a data structure that includes an item identifier 230 as well as an item description 232.

For example, an illustrative ring tone (symphony ring tone) is identified by item identifier "001234567." By way of a second example, a game 268 (World Builder Game) is identified by item identifier "009874653." We do not attempt to depict the many thousands or even millions of items of content that could be downloaded to mobile device 212. Moreover, the data stored in items database 226 might be of a format akin to that shown by illustration 234 or might be stored in some other manner. We do not mean to imply that representation 234 is narrow in nature or restrictive. It is not. It is provided so that discussing aspects of our technology is made easier. Many other data items could be stored in Table 228 or stored across a variety of tables in a hierarchical or relational database. For example, in the case of music, metadata such as a title, size, artist, etc. could be stored. In the case of a game, data such as a rating, a skill level, etc. could be stored.

Returning to request-management server 224, as mentioned, it receives requests for items of interest. In one embodiment, these requests are managed by way of an application 236 that monitors requests for content. As will be explained in greater detail below, request-management server 224 stores or has access to another data structure 238, which stores follow-up details and is described in greater detail in FIG. 2C. Request-management server 224 also has access to a customer-profiles database 240, which stores customer-profile information that is generally associated with mobile device 212. For example, customer-profiles database might store a data structure 242, which is shown in greater detail in FIG. 2B, which we will turn briefly to so as to provide an example of the type of information stored in customer-profiles databases in one or more embodiments.

Figure 2B:
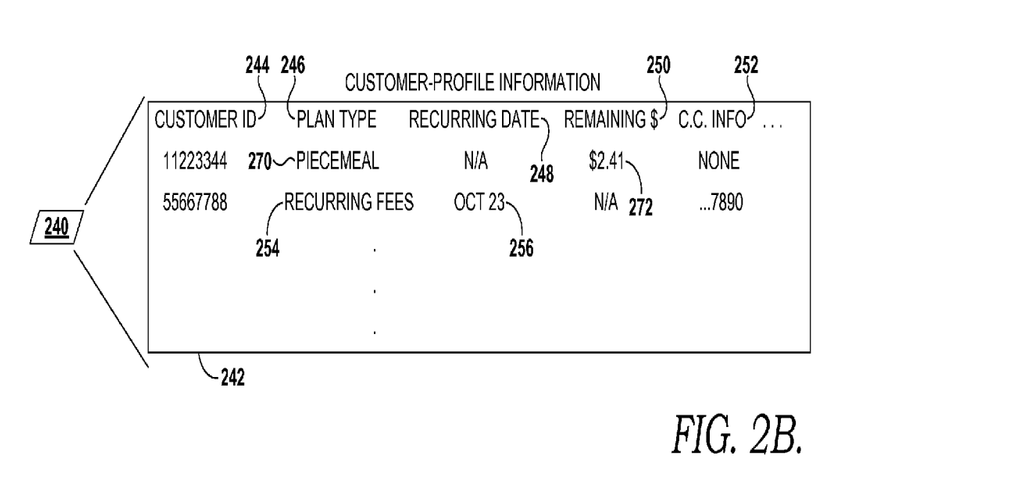
FIG. 2B depicts illustrative customer-profile information according to an embodiment of our technology.

Turning to FIG. 2B, what is shown as Table 240 might actually be a set of tables or other data structures that provide access to the information items shown in representation 242, which is a graphical representation of the contents in Table 240. Representation 242 stores customer-profile information. Again, this information might not actually be stored in the same table, but is shown here in more simple terms to help explain aspects of embodiments of our technology. By way of example, customer-profile information includes a customer ID 244, a plan type 246, a recurring-date indication 248, an amount of remaining funds 250, and credit card information 252. Customer identifier 244 identifies a customer. That is, customers consume wireless-telecommunication services. Generally, customers are associated with user devices. For example, a certain customer might be associated with mobile device 212. A customer ID 244 could take on a variety of forms. In one embodiment, the customer ID is the user's telephone number. In the case where a mobile device 212 is not a telephone, a customer ID could be any stream capable of identifying a user associated with mobile device 212.

Plan-type indicator 246 indicates a type of plan associated with a user. Two illustrative plans include a piecemeal plan 270 as well as a recurring-fees plan 254. A piecemeal 270 plan is a prepaid scenario in which a customer provides in advance a payment amount that is billed against as telecommunication services are used such that when the sum reaches zero (or some minimal threshold), a defined set of services (possibly all) are no longer available until the customer provides additional funds. This is sometimes referred to in the art as a pay-as-you-go (or "paygo" for short) model. A recurring-fees plan 254 is a prepaid scenario in which a customer provides in advance a payment amount in order to receive a set of telecommunication services until a certain date occurs. Examples include monthly unlimited plans or monthly not-to-exceed plans. Thus, plan-type indicator 246 indicates whether a customer is on a piecemeal, recurring-fees plan, or other if applicable.

The recurring-date field 248 stores an indication of a date 256 that recurring fees are due. For example, a user might be on a monthly unlimited plan in which payment is expected by October 23rd if services are to continue uninterrupted. Because the setting for this technology is a prepaid context (a scenario in which a customer makes a payment in advance for wireless telecommunication services), there is a date in which services will no longer be provided if funds are no longer provided by the customer. Thus, a user might miss the October 23rd date. But if the user does not miss the October 23rd date, and provides additional funds, then the user will be able to continue to utilize a given set of wireless telecommunications services. Generally, this field is not applicable in connection with a piecemeal plan. This is because generally a piecemeal plan contemplates a certain quantity of telecommunication services that can be used without an expiration date per se. For example, a person might purchase 500 minutes of usage. They would be entitled to spread out usage of those 500 minutes irrespective of a time horizon (which might be capped in some cases).

Remaining-balance indicator 250 indicates either a remaining balance, or a remaining quantity of items such as minutes or kilobytes of data, or some other measure. For example, in the case of a piecemeal plan, the remaining-balance indicator 250 might indicate a number of minutes that a person has left to use. In another embodiment, remaining-balance indicator 250 indicates a dollar balance. In such a situation, a user might have paid for say $50 of usage. This would entitle the user to use perhaps as many minutes, bytes of data, content, etc. until the $50 runs out. Generally, this field is not applicable when used in connection with a recurring-fees plan. This is because in a recurring-fees model a user has paid a fixed amount for a fixed, sometimes unlimited, amount of usage until some date.

Immediate-payment-information field 252 can store information that is usable to immediately purchase an item of content in some cases. In many cases, there will be no information in this field because many customers in a prepaid context will not store something such as a credit card on file. They will prepay for their services, and provide no way to pay for anything not agreed upon at the time of the prepayment. But in some cases information such as credit-card information might be stored, and in those cases it is stored in field 252.

Returning to FIG. 2A, request-management server 224 is also coupled to one or more billing components, which are illustratively represented by numeral 244. Billing components 244 could include a complete billing system, the details of which go beyond the scope of this disclosure. The functionality provided by billing components 244 is to log information associated with billing a customer in connection with attempting to obtain desired items of content from, for example, items database 226.

Many of the items in FIG. 2A that are shown as a single representation (or box) might actually be multiple items in an implementation. For example, request-management server 224 itself might be made up of multiple components instead of just a single component. And, as mentioned, the items database 226 and customer profiles database 242 each might be made up of various databases, but we show one representation to make explaining aspects of the technology simpler. Similarly, we do not mean to imply that the connections of FIG. 2A are direct connections. For example, various components would lie between network-access server 220 and request-management server 224. Similarly, different types of components would lie between request-management server 224 and billing components 244. Sometimes these intermediary components might even be owned by different entities, which work together to receive and provide some of the different portions of information that we discuss.

As briefly mentioned in the summary, an embodiment of our technology facilitates a method of providing an item of content to a mobile device in a prepaid context by way of a wireless-telecommunications network (a portion of which is shown in FIG. 2A). An aspect of the prepaid model for providing wireless telecommunication services contemplates a scenario in which a customer makes a payment in advance for such services. Usually a customer will pay for a set of services, and that is it. Thus, in some situations there is no mechanism to provide additional services to the user because there is no way to contemporaneously receive payment for such additional services. It is in this prepaid setting that aspects of our technology can be applied to enrich the user's experience by providing a way for customers to receive desired content.

By way of example, consider someone who is on a recurring-fees plan. This is a plan that contemplates a certain amount of service to be provided for a certain amount of time. As mentioned, sometimes this includes monthly unlimited plans. Thus, a user on an unlimited plan will receive access to an unlimited amount of one or more services provided by a wireless-telecommunications provider until some date, whereas access to certain types of services is unlimited, users generally do not have access to all content in all places at all times. For example, users might be allowed to speak for an unlimited number of minutes in a recurring-fees plan. But this does not mean that they are able to download an unlimited or even a single ring tone without paying for it. This is because ring tones might not be included within the scope of the recurring-fees plan. Similarly, other items such as those that exist in items database 226 are also not included. Users may not be able to download games, screensavers, songs, etc. without paying for them. But because this is a prepaid context, there might not be a way for a user to contemporaneously pay for the desired items. If the plan were not a prepaid plan, then a user would find a desired song, for example, request it, and it would be communicated to the user's device. This would be possible because the user would be billed for this exchange afterwards; that is, after the item of content has been delivered to the user's mobile device.

But in a prepaid context, items and services are paid for before they are made accessible to a user. Thus, continuing with our prophetic example, a user on a recurring-fees plan would manifest a desire to obtain a desired item of content, which, for purposes of this example, we will assume is a certain ring tone. There are a variety of ways that a user might manifest an interest in the ring tone (or any item of content). By way of example, mobile device 212 might be used to navigate to a storefront such as a website that presents an option to obtain the ring tone. In some embodiments, the user might attempt to actually obtain the ring tone; in other embodiments, the user might select to hear a preview of the ring tone. Either of these might be considered a request, and aspects of our technology can be configured by the user in some embodiments, or can be handled at implementation. For example, the technology might be set up such that reminders are provided consistent with our technology incident to actual requests for purchase. Thus, the user might attempt to purchase the desired ring tone. Doing so would trigger a request to be received by request-management server 224 for the item of content. Incident to receiving the request, request-management server 224 would query customer-profiles database 240 to determine customer-profile information associated with device 212. If the customer in our example was associated with identifier "55667788" (FIG. 2B), then request-management server 224 would learn that the customer is on a recurring-fees plan as indicated by reference numeral 254.

Request-management server 224 would also reference items database 226 to determine information associated with the received request. For example, request-management server 224 might retrieve the item identifier and/or an item description or other information that is to be logged in follow-up details 238. The follow-up details 238 are details that are to be used in connection with providing a follow-up reminder to mobile device 212. For example, this particular customer's recurring date is October 23rd, as shown by reference numeral 256 of FIG. 2B. According to an embodiment of our technology, customer-profile information 240 would indicate that this customer is not permitted to currently obtain the item of interest, and would thus store information that is usable to provide a reminder at an opportune time, such as some period of time before the customer's recurring date. Request-management server 224 might communicate to mobile device 212 that it is not authorized to obtain the content. But later as October 23rd approaches, request-management server 224 would send a reminder to mobile device 212 to include sufficient funds so as to enable a purchase of the desired item of content. In one embodiment, the reminder sent would include a link that, if acted on, would immediately provide the item of interest to mobile device 212. Some illustrative examples of an amount of time before a customer's recurring date are one day, two days, three days, and the like. In other embodiments, multiple messages can be sent to mobile device 212.

Figure 2C:
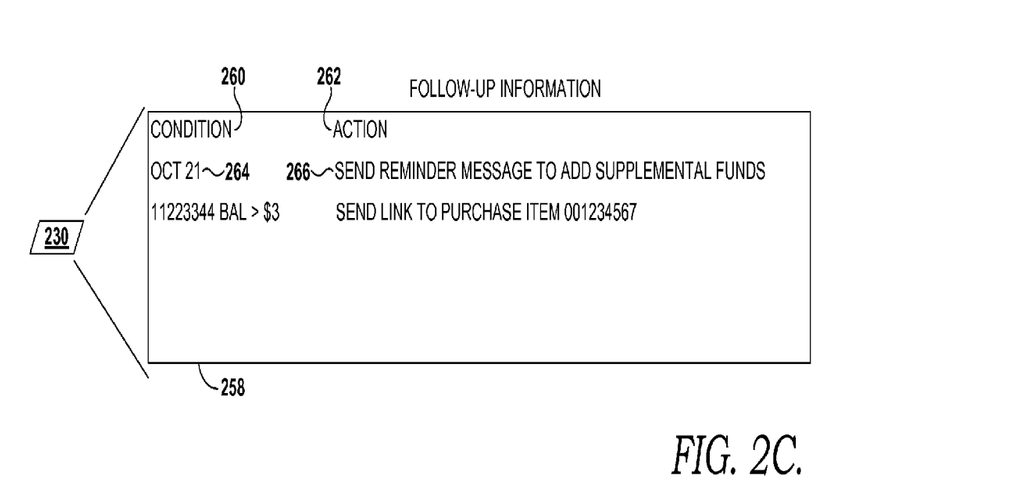
FIG. 2C depicts an illustrative set of follow-up information according to an embodiment of our technology.

Turning now to FIG. 2C, a representation 258 is provided that shows in a high-level form illustrative aspects of follow-up information according to an embodiment of our technology. We do not mean to imply that representation 258 is narrow or restrictive in nature, but only to provide an indication of some functional aspects associated with our technology so that explaining it can be done easier. In this way, follow-up information might include some condition 260 as well as an action to be carried out 262. For example, if two days was adopted as a reminder time frame, then a condition 260 that would be applicable to the prophetic example that we have been discussing would be that date itself; namely, "October 21st," which is indicated by reference numeral 264. Thus when October 21st arrives, the specific action 266 would be carried out, which would entail sending a reminder message to device 212 to add supplemental funds that would be sufficient to pay for both the desired services of next month and/or the item of content desired, which in this case is a certain ring tone. Instead of paying $99, for example, the reminder might include a message that encourages the user to provide $101 worth of credit, thereby leaving $2 to pay for a $2 ring tone, for example, In other embodiments, the sending of the reminder might be triggered by an addition of funds automatically. That is, if a user were to go on line or enter a storefront and for some reason add say $10 of credit, then as soon as that amount of credit is registered by billing components 244, request-management server 224 would send a reminder notification to mobile device 212 with a link to the desired ring tone (or other item of interest). In this way, a user would need to only click on the link, which would include embedded information that would automatically facilitate receiving and communicating the ring tone to mobile device 212. The link might include the item identifier so that the item could be automatically obtained and sent to mobile device 212.

Another prophetic example would include a scenario where the user of device 212 was on a piecemeal plan. In this case, a user might attempt to purchase the "World Builder game" 268 of FIG. 2A. Thus, the request would ultimately be received by request-management server 224, which would reference the appropriate customer-profile information in customer-profiles database 240 to determine that this customer is on a piecemeal plan, which is indicated by reference numeral 270 in this example. Request-management server 224 would also learn that this customer's remaining balance 272 is only $2.41, which is less than the amount necessary to purchase the "World Builder Game" 268, which we will say is $4 for purposes of explanation. With no way to contemporaneously pay for the desired item of interest, request-management server 224 might communicate a message to device 212 that insufficient funds exist to purchase the game and also include an indication of an amount of funds necessary to be added in order to purchase the game. This reminder, as well as a follow-up reminder, could include a link that is prepopulated with the corresponding item identifier so that when sufficient funds are available, acting on the link is sufficient to have the game (or any other content) communicated to mobile device 212.

Now say that the user mobile device 212 provides $10 of additional funds to his or her account. The remaining balance would be increased to $12.41, which being sufficient to obtain the $4 "World Builder Game," would automatically trigger the sending of a reminder to mobile device 212 that includes a link to purchase the item of content. In some embodiments, a link might not be included. But to help create a better user experience, in some embodiments a link is included.

Figure 3:
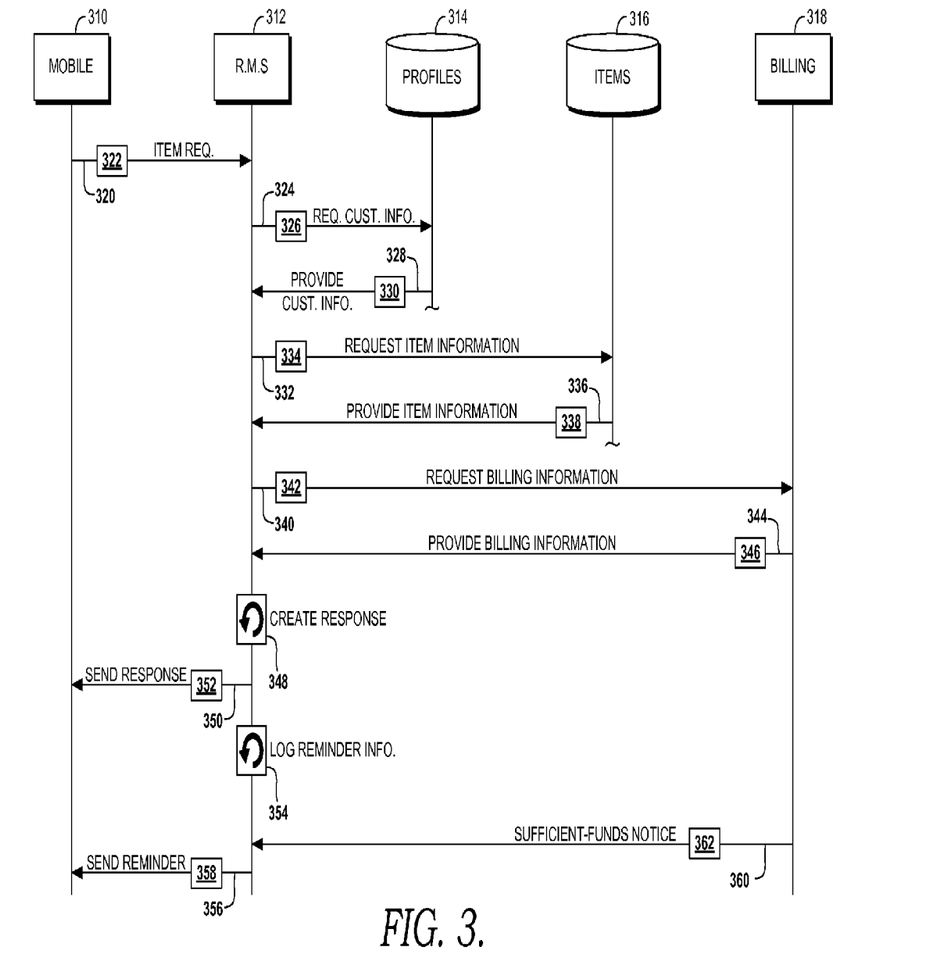
FIG. 3 depicts an illustrative data-flow diagram suitable for practicing an embodiment of our technology.

Turning now to FIG. 3, an illustrative flow diagram that illustrates an embodiment of our technology is provided. FIG. 3 includes representations of a mobile device 310, a request-management server 312, a profiles database 314 that stores profile information of users, an items database 316 that stores information associated with items that can be communicated to mobile device 310, and a billing system 318. At a step 320, an items request 322 is communicated from mobile device 310 to request-management server 312. Request 322 might not be a request to obtain a desired item per se. In some embodiments, request 322 takes the form of a request for information. This might be a link that provides information about or a preview of some item of content.

At a step 324, a request 326 for information about a customer associated with mobile device 310 is communicated to profiles database 314 to the extent it is not a part of request-management server 224. The request 326 for customer information would include a request for different types of information in different embodiments. Not all requests need to be the same. For example, request 326 might include a request for an indication of a type of service plan associated with mobile device 310. Request 326 might also be a generic request for information, which is provided based on a set of rules. For example, whenever request 326 is received at profiles database 314 (or a server associated with profiles database 314), that request is responded to by providing a predefined set of customer information. In other embodiments, request 326 includes specific requests for certain types of information.

At a step 328, customer information 330 is provided to request-management server 312, which will be able to use the information 330 to create a response that will be sent to mobile device 310. As alluded to, customer information 330 can include various types of information according to various embodiments of our technology. In one embodiment, customer information 330 includes an indication of the type of service plan associated with mobile device 310. Customer information 330 might also include an indication of a recurring date that funds are replenished in a recurring-fees scenario, a remaining balance that is available, and possibly immediate-payment information. Although we show different requests being sent from certain devices to certain devices, we do not mean to imply that the requests are necessarily generated by the devices shown per se. Moreover, the requests are not necessarily direct requests that are sent directly to the different items. There might be intervening items that facilitate the communication of data described in FIG. 3. We include the communications paths of FIG. 3 to help illustrate aspects of our technology rather than to constrain embodiments to the drawing provided. Still further, we do not mean to imply a specific order in the steps shown. For example, the request 326 for customer information might come after a request 334 for item information.

At a step 332, a request 334 is made for information about the item of interest. At a step 336, information 338 about the item is provided to request-management server 312. In one embodiment, item information 338 includes information such as an item identifier, an item description, metadata that describes the item, a title, a genre, a file size, and other similar attributes that are associated with the item. In other embodiments, information 338 is only an item identifier, which is sufficient to uniquely identify the item of content. This information will also be used in one embodiment to create a response that will be communicated to mobile device 310.

At a step 340, a request 342 for billing information is communicated to a billing system 318. This step does not need to be performed in all embodiments (similar to others). For example, in some embodiments the information 346 that is provided from the billing system at a step 344 is obtained by way of customer information 330. But in other embodiments, information such as a billing plan or amount of remaining balance is included within billing information 346. But as mentioned, in other embodiments it is included as part of customer information 330.

At a step 348, request-management server 312 creates a response at a step 350 that is to be communicated to mobile device 310. In one embodiment, the response 352 is created based on one or more of the customer information 330 obtained, the item information 338, and/or billing information 346. The response 352 can include a hyperlink to the item of interest. In other embodiments, a hyperlink is not included. Response 352 provides an indication to mobile device 310 that there is currently no way to contemporaneously pay for the item of interest. It can include an indication of an amount that is required to be provided that would enable purchase of the item of interest. It could also include a reminder to add an additional amount of funds at a certain date so that the item of interest can be purchased.

At a step 354, the request-management server 312 logs reminder information, such as that of FIG. 2C. The reminder information is used to send a reminder 358 at a step 356 at some point in the future. For example, if the user is on a recurring-fees plan, then the reminder will be sent a few days prior to a time when the user is to provide another cycle's worth of funds. If the user is on a piecemeal plan, then reminder 358 could be sent immediately upon determining that sufficient funds exist to purchase the item of content. This would be the scenario shown in FIG. 3 in which a sufficient hike in funds notice 362 is communicated from billing system 318 at a step 360.

Figure 4:
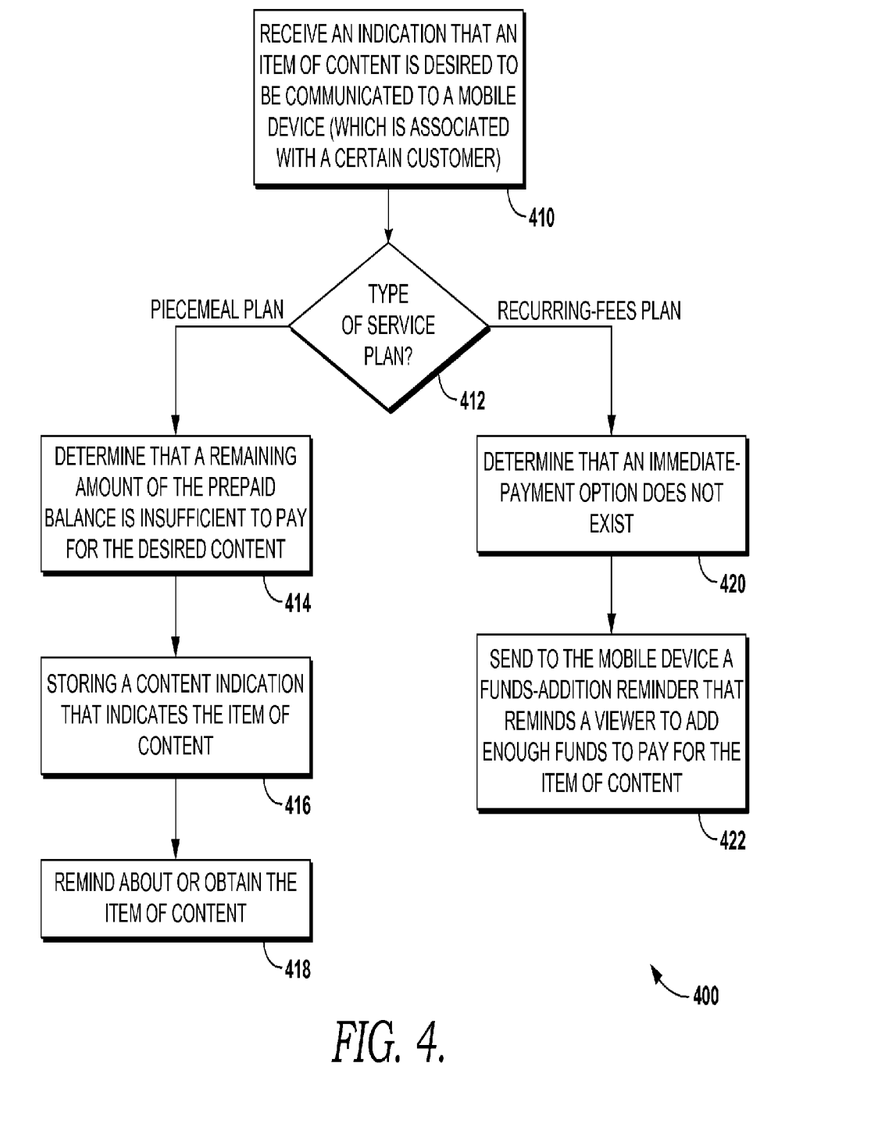
FIGS. 4-6 depict illustrative methods of providing an item of content to a mobile device in a prepaid context according to embodiments of our technology.

Turning now to FIG. 4, an illustrative method of providing an item of content to a mobile device in a prepaid context is provided and referenced generally by the numeral 400. At a step 410, an indication is received that an item of content is desired to be communicated to a mobile device, which is associated with a certain customer. Thus, a user of a mobile device such as 212 communicates an indication that an item of content is interesting to him or her. This can happen by way of browsing at a storefront or other website or Internet location by way of the mobile device 212. At a step 412, a determination is made as to a type of service plan associated with mobile device 212. In one embodiment, if mobile device 212 is associated with a piecemeal plan, then processing advances to a step 414, in which a determination is made that a remaining amount of a prepaid balance is insufficient to pay for the desired content. Thus, if only $2 remains in a balance of an accountholder, but the item of interest costs $5, then at a step 416 a content indication is stored that indicates the item of content. For example, one of the item identifiers in box 234 of FIG. 2A would be stored. At an opportune time, a reminder 418 is communicated to mobile device 212 that the item of content can be obtained by way of a hyperlink embedded in the reminder. In other embodiments, based on configuration, the content could be obtained automatically. For example, if a user configured his or her account to purchase items of content that have been requested as soon as sufficient funds have been provided, then as soon as those funds are made available the content is automatically obtained without user intervention. In some embodiments, if a customer does not fund the account within a certain number of days (i.e. 30, 45, 365, etc.), then the stored purchased transactions/attempts/reminder info expire and are removed. Whereas information related to all failed transactions can be stored in one embodiment, in others, only the N most recent are stored (such as 3, 10, 50, etc.), which is also applicable to an unlimited scenario.

Returning to determination step 412, if mobile device 212 is associated with a recurring-fees plan, then a determination is made that an immediate-payment option does not exist at a step 420. For example, there is no credit card on file and there are no additional funds in the user's account to pay for the item desired. In this case, a reminder could be generated and at a step 422 sent to the mobile device so as to remind a viewer to add enough funds to pay for the item of content. In this way, a user is able to obtain the item of content because sufficient funds will be added in addition to a recurring amount that will enable the item of interest to be obtained.

Figure 5:
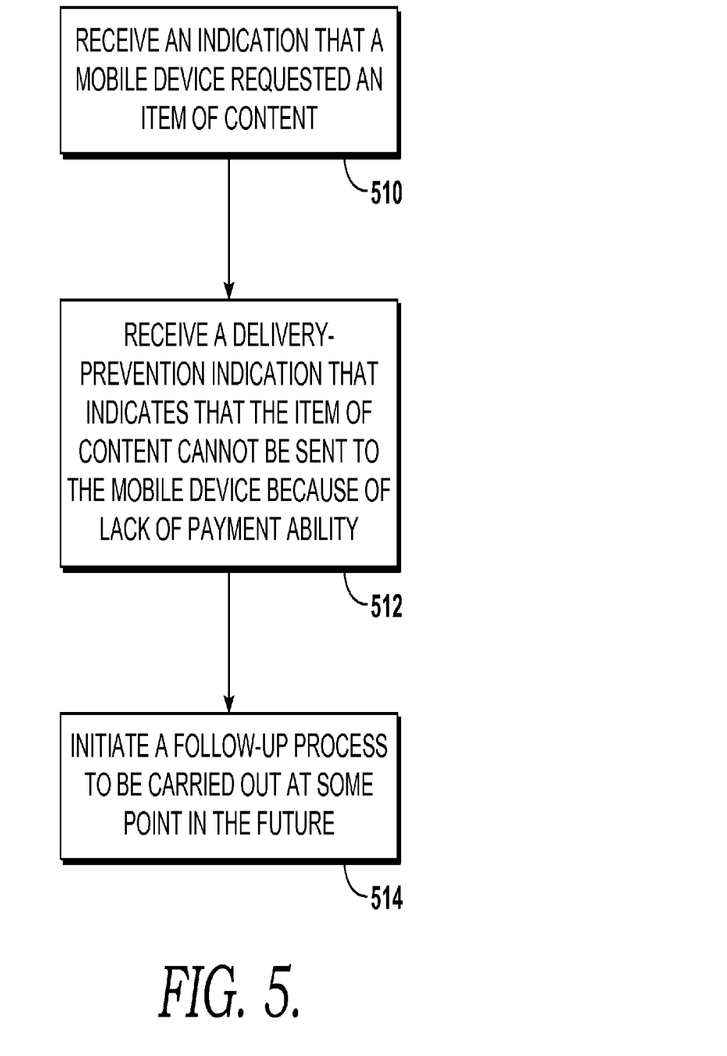

Turning now to FIG. 5, another illustrative method of providing an item of content to a mobile device in a prepaid context is provided. In this embodiment, an indication that a mobile device requested an item of content is received at a step 510. Thus, it might be the case that the request is not received at the request-management server first. In any case, eventually an indication of the request is received at a device such as request-management server 224.

At a step 512, some sort of delivery-prevention indication is received that indicates that the item of content cannot be sent to the mobile device because of the lack of an ability to pay for the item. When this occurs, a follow-up process is initiated, which is to be carried out at some point in the future at a step 514.

We have previously described some options for different types of follow-up processes. For example, in one embodiment, incident to receiving notice that the remaining amount of the prepaid balance is large enough to pay for the item of content, a message is communicated to the mobile device that includes a reminder to purchase the item of content. In another embodiment, after a failed purchase attempt but prior to the remaining amount becoming a sufficient amount, sending a preorder request to the mobile device that, if accepted, will cause the item of content to be purchased immediately when the remaining amount becomes a sufficient amount. In still another embodiment, the content can be automatically purchased without any user interaction when the remaining amount becomes the sufficient amount. A user might configure this out of convenience, and our technology would provide the same.

Figure 6:
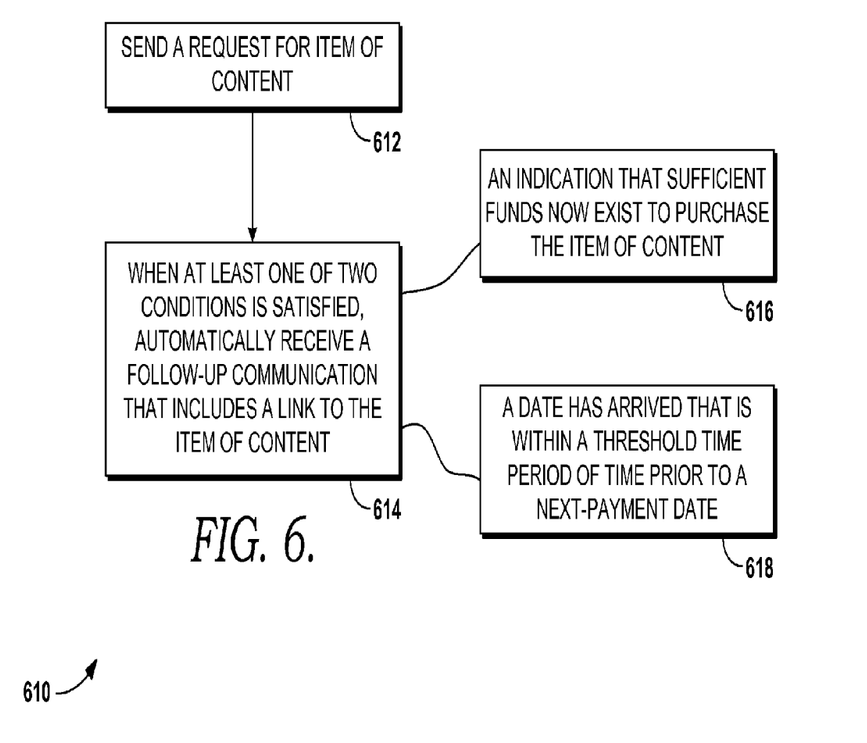

Turning now to FIG. 6, still another method of providing an item of content to a mobile device in a prepaid context is provided and referenced generally by the numeral 610. At a step 612, a request for some item of content is sent from a mobile device such as mobile device 212. This request is communicated through a wireless telecommunications network and leads to a determination that insufficient funds exist to enable the content to be communicated to the mobile device. In this way, when at least one of two conditions is satisfied a follow-up communication is automatically received at a step 614 that includes a link to the item of content. One of the conditions is indicated by reference numeral 616 in which an indication that sufficient funds now exist to purchase the item of content is received. For example, this is shown in step 360 of FIG. 3. Another possible condition that could be satisfied is the arrival of a date 610 within a threshold time period before a next-payment date. Thus, if a person's next-payment date is November 6th, for example, then as soon as November 2nd or 3rd, etc. arrives, then a reminder such as reminder 358 can be communicated to mobile device 310. And as mentioned, this reminder can include a link in some embodiments that, if acted on, would take a user directly to the item of content and when sufficient funds are available even enable a purchase.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, facilitate a method of providing an item of content to a mobile device in a prepaid context by way of a wireless telecommunications network; the method comprising:

receiving an indication that the item of content is desired to be communicated to a mobile device that is associated with a certain customer;

determining that the customer obtains wireless-telecommunications services according to one of the following plans,     (1) a piecemeal plan, in which a prepaid balance is billed against;

or

(2) a recurring-fees plan, in which a services prepayment is to be received by a certain date;

when the customer is associated with the piecemeal plan, determining that a remaining amount of the prepaid balance is insufficient to pay for the desired content, and thereby triggering a first follow-up process such that after a failed purchase attempt but prior to the remaining amount becoming a sufficient amount, communicating a pre-order request to the mobile device that, if accepted, will cause the item of content to be purchased immediately when the remaining amount becomes the sufficient amount; and     when the customer is associated with the recurring plan, determining that an immediate-payment option does not exist, and thereby triggering a second follow-up process.

2. The computer-readable media of claim 1, wherein the item of content includes one or more of the following     a game;

a ring tone;

a song;

a media clip;

a file; and a service offering.

3. The computer-readable media of claim 1, wherein the indication includes a purchase request.

4. The computer-readable media of claim 1, wherein the determining includes referencing a customer-profiles database that includes information that indicates a type of service plan that the customer is associated with.

5. The computer-readable media of claim 1, wherein the prepaid balance is reduced as at least a portion of the wireless telecommunications services are used.

6. The computer-readable media of claim 5, wherein the at least a portion of the wireless telecommunications services includes one or more of the following:

minutes of usage of voice;

minutes of usage of data services;

a quantity of data communication;

a number of text messages;

a number of emails; and a number of picture mails.

7. The computer-readable media of claim 1, wherein the services prepayment is an advanced payment that is received prior to services usage.

8. The computer-readable media of claim 7, wherein the certain date is a date that occurs at regular intervals.

9. The computer-readable media of claim 1, wherein the first follow-up process includes:

storing a content indication that indicates the item of content; and one or more of the following,     (1) incident to receiving notice that the remaining amount of the prepaid balance is large enough to pay for the item of content, communicating a message to the mobile device that includes a reminder to purchase the item of content;

(3) automatically purchasing the content without any user interaction when the remaining amount becomes the sufficient amount.

10. The computer-readable media of claim 1, wherein the second follow-up process includes communicating to the mobile device a funds-addition reminder that serves to remind a viewer to add an amount of funds sufficient to pay for the item of content.

11. The computer-readable media of claim 10, wherein the communicating the funds-addition reminder occurs within a threshold time period prior to the certain date.

12. The computer-readable media of claim 11 wherein the threshold time period is three days.

13. One or more non-transitory computer-readable media having computer-executable instructions embodied thereon that, when executed, facilitate a method of providing a item of content to a mobile device in a prepaid context by way of a wireless telecommunications network, the method comprising:
- receiving an indication that a mobile device requested the item of content;
- receiving a prepaid indication that indicates that the device is associated with a prepaid plan;
- receiving a delivery-prevention indication that indicates that the item of content cannot be communicated to the mobile device because payment for the item cannot be contemporaneously obtained; and
- initiating a follow-up process to be carried out at some point in the future.

14. The computer-readable media of claim 13, wherein the follow-up process includes one or more of:
- communicating a reminder of a first type to the mobile device when sufficient funds are associated with a user account that is associated with the mobile device, wherein the sufficient funds enable a purchase of the item of content; and
- communicating a reminder of a second type to the mobile device at a time before a date when additional funds are expected to be added to the, or similar, user account.

15. The computer-readable media of claim 14, wherein each of the reminders includes a link that, if acted on, facilitates obtaining the item of content.

16. The computer-readable media of claim 14, wherein the time is a week prior to the date.

17. The computer-readable media of claim 13, wherein the indication includes a purchase request.

18. One or more non-transitory computer-readable media having computer-executable instructions embodied thereon that, when executed, facilitate a method of providing a item of content to a mobile device in a prepaid context by way of a wireless telecommunications network, the method comprising:
- by way of a mobile communications device, communicating a request that conveys an interest in receiving the item of content, wherein the request is communicated though the wireless telecommunications network and leads to a determination that insufficient funds exist to enable the content to be communicated to the mobile communications device;
- when at least one of two conditions is satisfied, automatically receiving a follow-up communication that includes a link that, when acted on, is operable to obtain the item of content, wherein the two conditions include,
  (1) an indication that sufficient funds now exist to purchase the item of content; or
  (2) a date has arrived that is within a threshold time period of time prior to a next-payment date.

19. The computer-readable media of claim 18, further comprising:
- receiving the follow-up communication;
- receiving an action that utilizes the link; and
- receiving the item of content.

20. The computer-readable media of claim 19, wherein the action is a click action.

* * * * *